US008882525B2

(12) United States Patent
Mori et al.

(10) Patent No.: US 8,882,525 B2
(45) Date of Patent: Nov. 11, 2014

(54) POWER FEEDING CONNECTOR

(75) Inventors: Shigeo Mori, Makinohara (JP);
Takenori Ohmura, Makinohara (JP)

(73) Assignee: Yazaki Corporation, Tokyo (JP)

( * ) Notice: Subject to any disclaimer, the term of this patent is extended or adjusted under 35 U.S.C. 154(b) by 74 days.

(21) Appl. No.: 13/611,334

(22) Filed: Sep. 12, 2012

(65) Prior Publication Data
US 2013/0023145 A1    Jan. 24, 2013

Related U.S. Application Data

(63) Continuation of application No. PCT/JP2011/075887, filed on Nov. 2, 2011.

(30) Foreign Application Priority Data

Nov. 2, 2010  (JP) ................................. 2010-246475

(51) Int. Cl.
H01R 13/62        (2006.01)
H01R 13/631      (2006.01)
B60L 11/18        (2006.01)
H01R 13/627      (2006.01)

(52) U.S. Cl.
CPC ............... *H01R 13/631* (2013.01); *Y02T 90/14* (2013.01); *Y02T 10/7005* (2013.01); *Y02T 10/7088* (2013.01); *Y02T 90/121* (2013.01); *B60L 11/1818* (2013.01); *H01R 13/6275* (2013.01); *H01R 2201/26* (2013.01)
USPC ............................. 439/310; 439/357; 439/372

(58) Field of Classification Search
USPC ........................... 439/310, 350, 352, 357, 372
See application file for complete search history.

(56) References Cited

U.S. PATENT DOCUMENTS

| 5,417,579 A |   | 5/1995  | Yoshioka et al. |
| 5,556,284 A |   | 9/1996  | Itou et al. |
| 5,584,712 A | * | 12/1996 | Fukushima ................... 439/141 |

(Continued)

FOREIGN PATENT DOCUMENTS

| DE | 4432194 A1  | 4/1995 |
| DE | 19650099 A1 | 6/1997 |

(Continued)

OTHER PUBLICATIONS

Written Opinion dated Jan. 30, 2012 issued in International Application No. PCT/JP2011/075887 (PCT/ISA/237).

(Continued)

*Primary Examiner* — James Harvey
(74) *Attorney, Agent, or Firm* — Sughrue Mion, PLLC

(57) ABSTRACT

In a power feeding connector 7, a housing front side tubular part 81 of a power feeding side connector 8 to be engaged with an inner periphery of an outer tubular wall part 51 of a power receiving side connector 5 is provided, on an outer periphery at a lower end side thereof, with a raised part 86 which overrides an inner peripheral face of the outer tubular wall part 51, before an engaging length of the housing front side tubular part 81 with respect to the outer tubular wall part 51 reaches a prescribed length, and the raised part 86 corrects a backwardly inclined state of the power feeding side connector 8 due to its dead weight into a state where axes of the outer tubular wall part 51 and the housing front side tubular part 81 are aligned with each other.

2 Claims, 11 Drawing Sheets

(56) References Cited

U.S. PATENT DOCUMENTS

| | | | |
|---|---|---|---|
| 6,283,781 B1 * | 9/2001 | Mori | 439/310 |
| 6,652,306 B2 * | 11/2003 | Karamatsu et al. | 439/310 |
| 8,439,699 B2 * | 5/2013 | Ohmura | 439/372 |
| 2003/0036302 A1 | 2/2003 | Fukuda | |
| 2006/0003631 A1 | 1/2006 | Fukatsu et al. | |
| 2007/0049110 A1 | 3/2007 | Chuang | |
| 2013/0023145 A1 * | 1/2013 | Mori et al. | 439/350 |

FOREIGN PATENT DOCUMENTS

| | | |
|---|---|---|
| JP | H09092393 A | 4/1997 |
| JP | 2752032 B2 | 2/1998 |
| JP | 2000113934 A | 4/2000 |
| JP | 2003133002 A | 5/2003 |
| JP | 2006019187 A | 1/2006 |

OTHER PUBLICATIONS

International Search Report dated Jan. 30, 2012 issued in International Application No. PCT/JP2011/075887 (PCT/ISA/210).

Office Action dated Feb. 3, 2014 issued by the European Patent Office in counterpart European Patent Application No. 11787751.4.

Office Action dated Jun. 17, 2014, issued by the State Intellectual Property Office of the People's Republic of China in counterpart Chinese Application No. 201180018403.3.

Office Action dated Sep. 16, 2014 issued in corresponding Japanese Patent Application No. 2010-246475.

* cited by examiner

POWER FEEDING CONNECTOR

CROSS REFERENCE TO RELATED APPLICATION

This application is a continuation of PCT application No. PCT/JP2011/075887, which was filed on Nov. 2, 2011 based on Japanese Patent Application (No. 2010-246475) filed on Nov. 2, 2010, the contents of which are incorporated herein by reference. Also, all the references cited herein are incorporated as a whole.

BACKGROUND OF THE INVENTION

1. Field of the Invention

The present invention relates to a power feeding connector which is used for charging a battery in an electric automobile, and more particularly, to an improvement for facilitating engagement and connection between a connector at a power receiving side and a connector at a power feeding side.

2. Description of the Related Art

FIGS. 8 and 9 show an example of a conventional power feeding connector which is used for charging a battery in an electric automobile.

This power feeding connector 1, which is disclosed in the below described PTL 1, includes a power feeding side connector 3 connected to a power supply, which is not shown, and a power receiving side connector 5 mounted on a vehicle body 4 of an electric automobile in such a manner the power feeding side connector 3 can be engaged and connected therewith.

The power feeding side connector 3 is provided with a housing front side tubular part 31 to be engaged with an inner periphery of an outer tubular wall part 51 in a substantially cylindrical shape of the power receiving side connector 5, and a lock arm 32 that is locked to a locking step part 52 formed on the inner periphery of the outer tubular wall part 51 so as to keep the power feeding side connector 3 and the power receiving side connector 5 in a fastened state, as shown in FIG. 10, when a length of engagement between the housing front side tubular part 31 and the outer tubular wall part 51 has reached a prescribed length.

As shown in FIG. 10, the lock arm 32 is so constructed that a locking projection 32b is provided at a distal end of an elastic piece 32a which is extended along a direction in which the connectors are mutually engaged. When the locking projection 32b is locked to the locking step part 52, the connectors are locked to each other in the fastened state.

PTL 1: Japanese Patent No. 2752032

In the above described power feeding side connector 3, as compared with the housing front side tubular part 31, a part including a housing body 33 which is continued from a back part of the housing front side tubular part 31 and a cable 34 which is extended from the housing body 33 to be connected to the power supply is larger, as shown also in FIG. 8. Therefore, a center of gravity is positioned backward from the housing front side tubular part 31.

For this reason, when the power feeding side connector 3 is engaged with the power receiving side connector 5, the power feeding side connector 3 tends to be in a backwardly inclined state in which the back part of the power feeding side connector 3 is lowered downward, as shown by an arrow mark R1 in FIG. 11. When the power feeding side connector 3 has become in the backwardly inclined state, an axis of the outer tubular wall part 51 and an axis of the housing front side tubular part 31 cross each other into a misaligned state, and in this state, terminal metal fittings inside the respective connectors are not aligned in position with respect to each other, and defective engagement will occur.

Moreover, when an operator forcibly pushes the power feeding side connector 3 into the power receiving side connector 5, in a state where the axis of the outer tubular wall part 51 and the axis of the housing front side tubular part 31 are misaligned, there is such anxiety that a region where they interfere may be damaged. Therefore, the operator has to be nervous about correction of the backwardly inclined state of the power feeding side connector 3 in order to solve the misalignment between the axes of the connectors. As the results, there has been a problem of bad operability.

SUMMARY OF THE INVENTION

In view of the above, an object of the present invention is to solve the above described problems, and to provide such a power feeding connector that on occasion of engaging and connecting a power feeding side connector with a power receiving side connector, an operator can correct a backwardly inclined state of the power feeding side connector without paying particular attention, and can smoothly complete engagement and connection between the connectors.

The above described object of the present invention can be achieved by the following structure.

(1) A power feeding connector comprising:

a power feeding side connector connected to a power supply; and a power receiving side connector mounted on a vehicle body of an electric automobile so that the power feeding side connector can be engaged with and connected to the power receiving side connector;

wherein the power feeding side connector includes a housing front side tubular part to be engaged with an inner periphery of an outer tubular wall part of the power receiving side connector, and a lock arm adapted to be locked to a locking step part formed on the inner periphery of the outer tubular wall part, when an engaging length of the housing front side tubular part with respect to the outer tubular wall part has reached a prescribed length, so as to keep the power feeding side connector and the power receiving side connector in a fastened state, wherein the housing front side tubular part is provided with a raised part which overrides an inner peripheral face of the outer tubular wall part, before the engaging length of the housing front side tubular part with respect to the outer tubular wall part reaches the prescribed length, and the raised part corrects a backwardly inclined state of the power feeding side connector due to its dead weight into a state where axes of the outer tubular wall part and the housing front side tubular part are aligned with each other.

(2) In a power feeding connector as described in the above item (1), the raised part is formed in a shape of a rib extending along a direction of engagement between the outer tubular wall part and the housing front side tubular part.

According to the structure as described in the above item (1), the power feeding side connector is inclined backward due to the dead weight thereof, and the axes of the outer tubular wall part and the housing front side tubular part become misaligned, in some cases, in an initial period when the power feeding side connector starts to be engaged with the power receiving side connector. However, as an operator further pushes the housing front side tubular part of the power feeding side connector into the outer tubular wall part of the power receiving side connector, the raised part which is provided on the outer periphery of the housing front side tubular part at the lower end side thereof overrides the inner peripheral face of the outer tubular wall part, before the engaging length of the housing front side tubular part with respect to the outer tubular wall part reaches the prescribed length.

When the raised part has overridden the inner peripheral face of the outer tubular wall part, a counter force of the override causes a rotation moment to be exerted on the power feeding side connector so as to eliminate the backwardly inclined state due to the dead weight. As the results, a direction of the power feeding side connector is automatically corrected so that the axes of the outer tubular wall part and the housing front side tubular part may come into alignment with each other.

Accordingly, when the power feeding side connector is engaged and connected with the power receiving side connector, the operator can correct the backwardly inclined state of the power feeding side connector without paying particular attention, thereby to smoothly complete the engagement and connection between the connectors.

According to the structure as described in the above item (2), because the raised part has a shape of a rib extending along the direction of engagement between the outer tubular wall part and the housing front side tubular part, a contact area between the outer tubular wall part and the raised part is increased, as the engagement between the outer tubular wall part and the housing front side tubular part proceeds, and an overriding length of the raised part with respect to the inner peripheral face of the outer tubular wall part becomes longer. As the results, it is possible to stably obtain the counter force for correcting the backwardly inclined state of the power feeding side connector.

According to the power receiving side connector of the present invention, as the engagement between the connectors proceeds, and the raised part formed on the outer periphery at the lower end side of the housing front side tubular part has overridden the inner peripheral face of the outer tubular wall part, the counter force of the override causes the rotation moment to be exerted on the power feeding side connector so as to eliminate the backwardly inclined state due to the dead weight. As the results, the direction of the power feeding side connector is automatically corrected so that the axes of the outer tubular wall part and the housing front side tubular part may come into alignment with each other.

Accordingly, when the power feeding side connector is engaged and connected with the power receiving side connector, the operator can correct the backwardly inclined state of the power feeding side connector without paying particular attention, thereby to smoothly complete the engagement and connection between the connectors.

DESCRIPTION OF THE PREFERRED EMBODIMENTS

Figure 1:
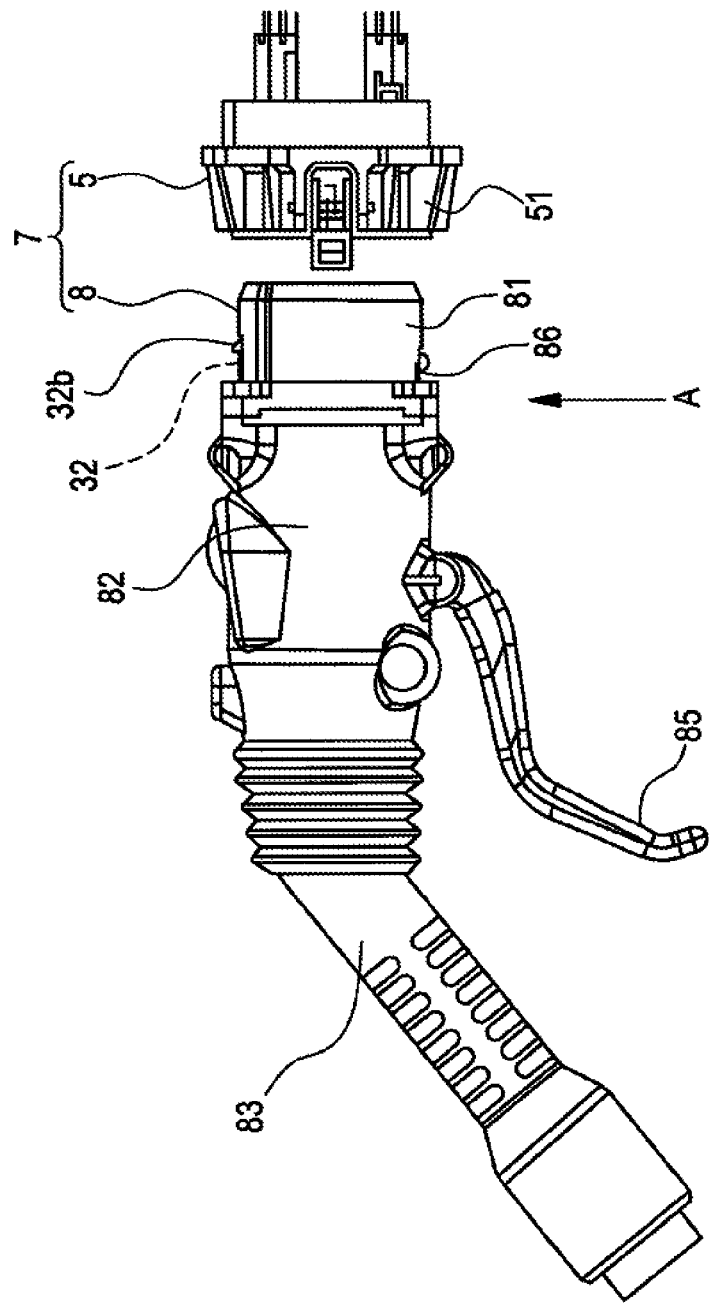
FIG. 1 is a side view of a power feeding side connector and a power receiving side connector in a state before they are engaged, in a power feeding connector in an embodiment according to the present invention.

Now, a preferred embodiment of the power feeding connector according to the present invention will be described, referring to the drawings.

Figure 2:
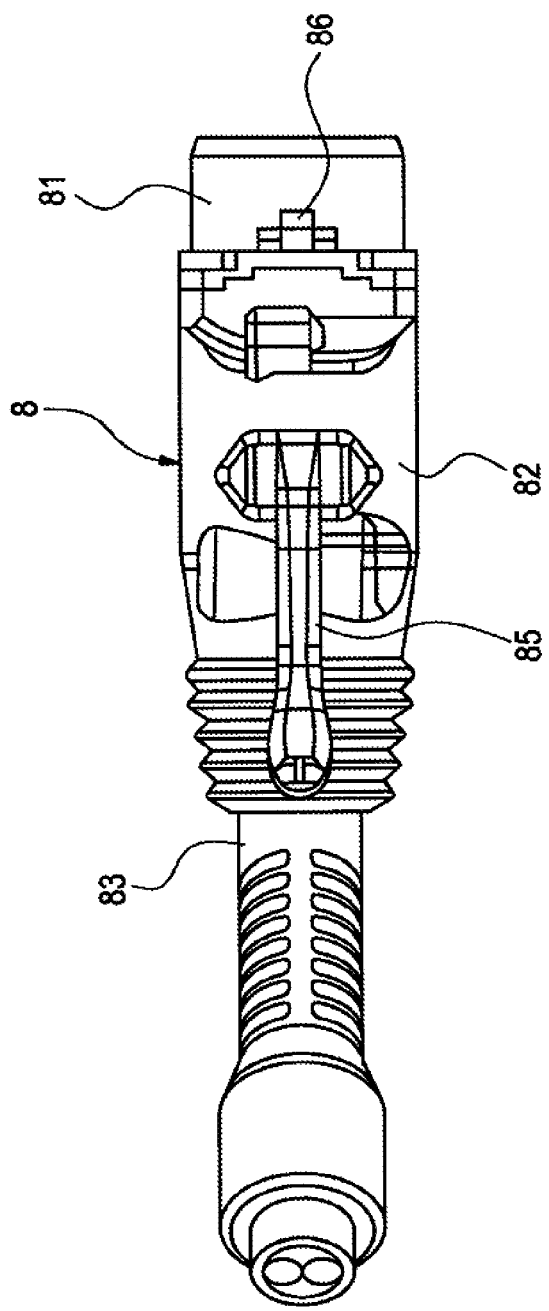
FIG. 2 is a view of the power feeding side connector, as seen from a direction of an arrow mark A in FIG. 1.
Figure 3:
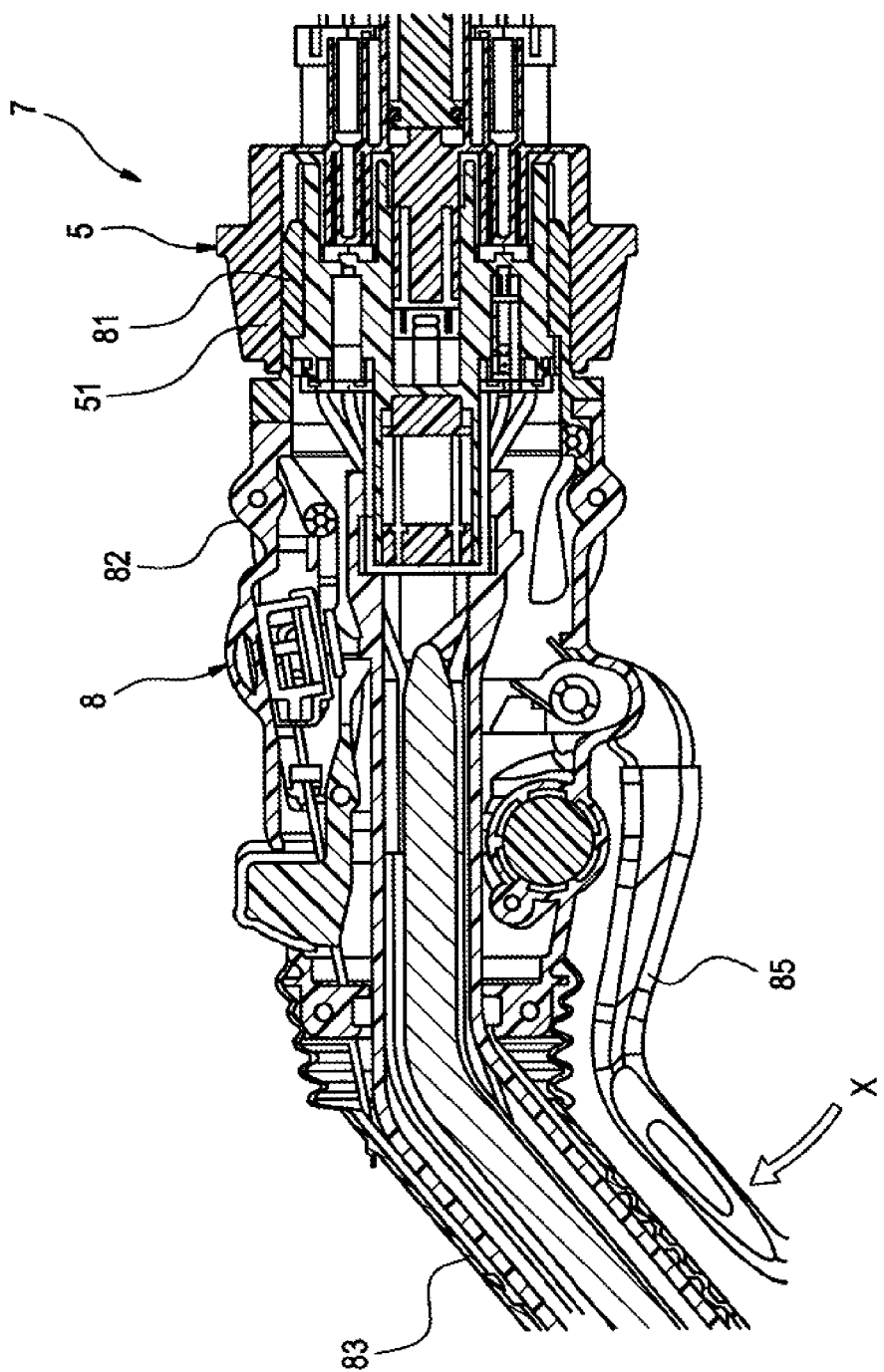
FIG. 3 is a longitudinal sectional view of the power feeding side connector and the power receiving side connector as shown in FIG. 1, in a state after the engagement has been completed.

FIGS. 1 to 3 show an embodiment of the power feeding connector according to the present invention. FIG. 1 is a side view of a power feeding side connector and a power receiving side connector in the power feeding connector in the embodiment, in a state before they are engaged, FIG. 2 is a view of the power feeding side connector, as seen from a direction of an arrow mark A in FIG. 1, and FIG. 3 is a longitudinal sectional view of the power feeding side connector and the power receiving side connector as shown in FIG. 1, in a state after the engagement has been completed.

Figure 8:
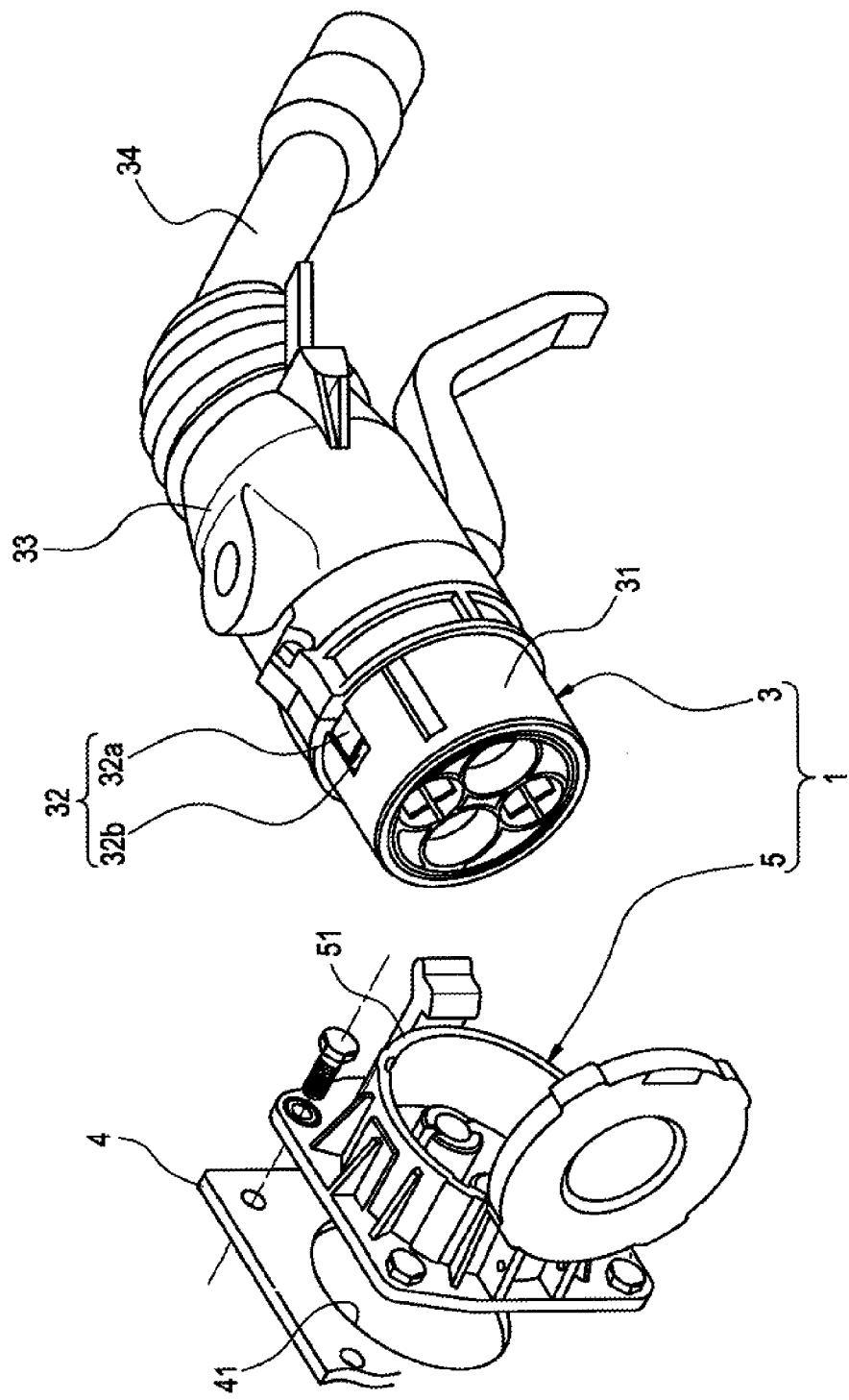
FIG. 8 is an exploded perspective view of a conventional power feeding connector.
Figure 9:
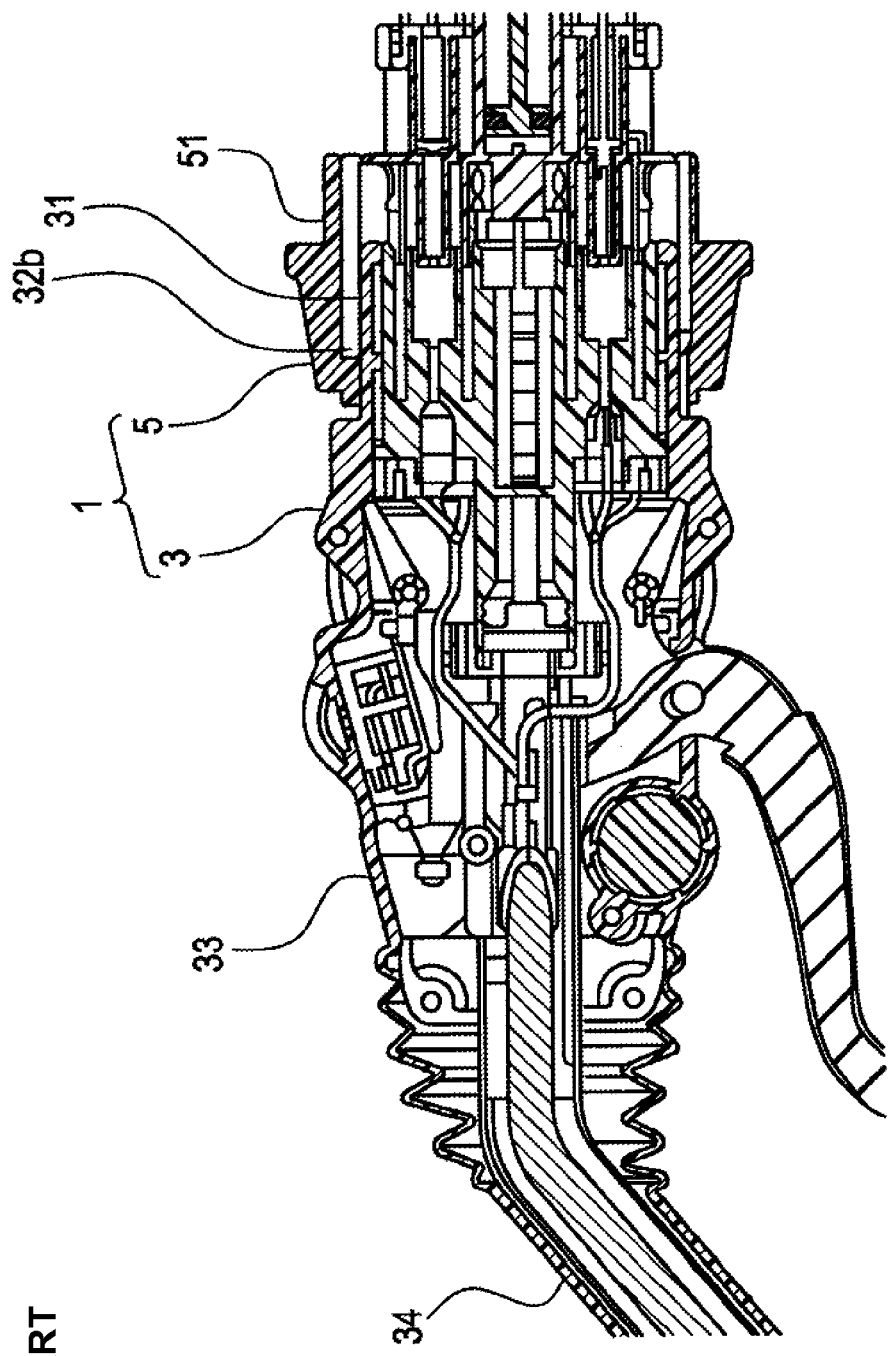
FIG. 9 is a longitudinal sectional view showing a state where engagement and connection between a power feeding side connector and a power receiving side connector as shown in FIG. 8 has been completed.
Figure 10:
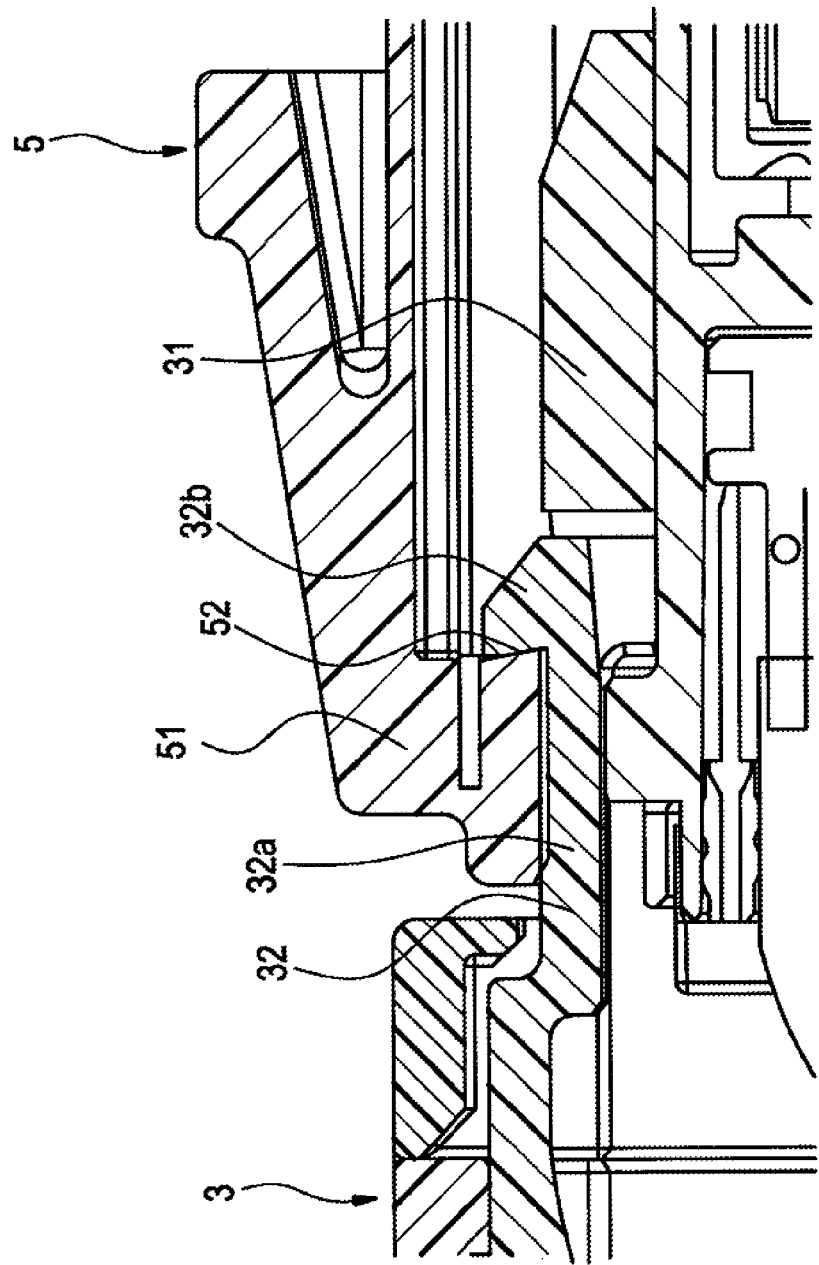
FIG. 10 is an enlarged view of a region surrounding a lock arm, showing a state where the connectors are locked to each other in a fastened manner by the lock arm, in a state where the connectors as shown in FIG. 9 have been normally engaged with each other.

A power feeding connector 7 in this embodiment includes a power feeding side connector 8 connected to a power supply, which is not shown, and a power receiving side connector 5 mounted on a vehicle body of an electric automobile so that the power feeding side connector 8 can be engaged with and connected to the power receiving side connector 5. The power receiving side connector 5 has the same structure as the power receiving side connector 5 which is shown in FIG. 8.

The power feeding side connector 8 is provided with a housing front side tubular part 81 to be engaged with an inner periphery of an outer tubular wall part 51 of the power receiving side connector 5, a housing body 82, a cable 83, a lock arm 32, a lock releasing lever 85, and a raised part 86.

The housing body 82 is a case body which is continued from a back part of the housing front side tubular part 81.

The cable 83 is an electric wire which is extended from the housing body 82 and connected to the power supply.

Figure 11:
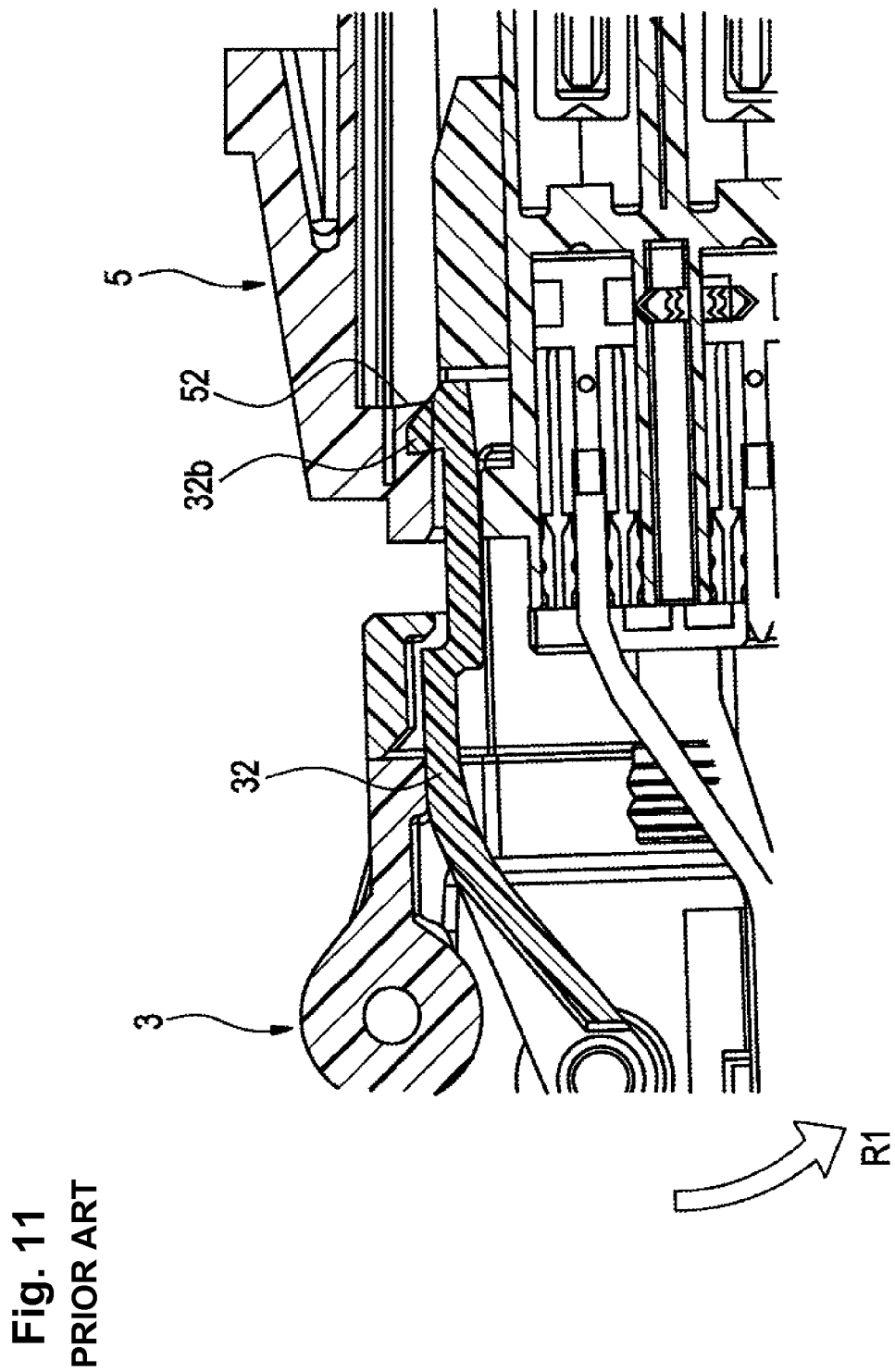
FIG. 11 is an enlarged view of the region surrounding the lock arm, in a state where the connectors as shown in FIG. 9 have been incompletely engaged with each other due to backward inclination of the power feeding side connector.

The lock arm 32 has the same structure as the lock arm 32 of the power feeding side connector 3 which is shown in FIG. 11. The lock arm 32 is locked to a locking step part 52 formed on the inner periphery of the outer tubular wall part 51 (See FIG. 11), when an engaging length of the housing front side tubular part 81 with respect to the outer tubular wall part 51 has reached a prescribed length, thereby to keep the power feeding side connector 8 and the power receiving side connector 5 in a fastened state.

By rotating the lock releasing lever 85 in a direction of an arrow mark X, as shown in FIG. 3, it is possible to release the locked state by the lock arm 32.

Figure 5:
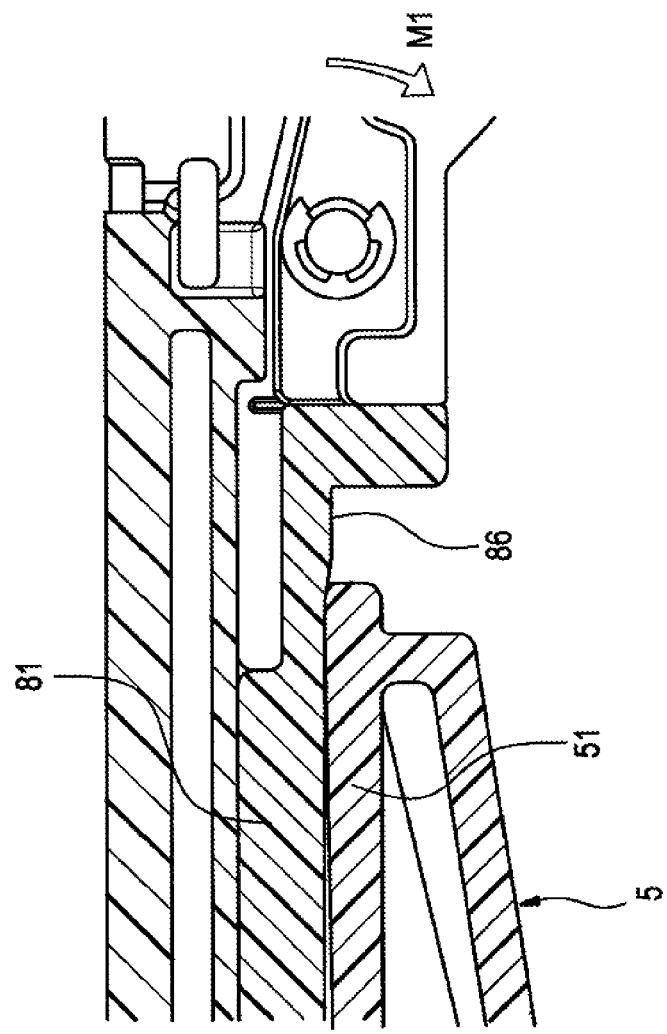
FIG. 5 is an enlarged view of a region B in FIG. 4.

The raised part 86 is provided in a raised manner on an outer periphery at a lower end side of the housing front side tubular part 81, as shown in FIG. 5, so as to override the inner peripheral face of the outer tubular wall part 51, before the engaging length of the housing front side tubular part 81 with respect to the outer tubular wall part 51 has reached the prescribed length.

Figure 4:
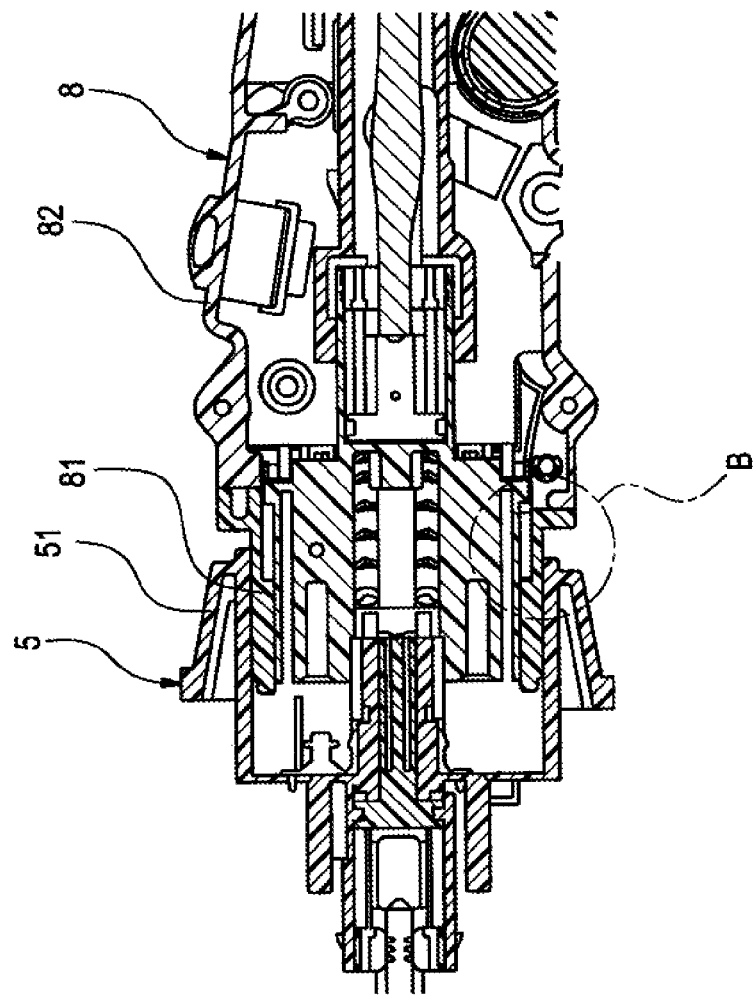
FIG. 4 is a longitudinal sectional view of the power feeding side connector and the power receiving side connector in the embodiment, showing a state in an initial period of the engagement.

More specifically describing, the raised part 86 is provided at a root side of the housing front side tubular part 81, so as not to override the inner peripheral face of the outer tubular wall part 51, in an initial period of the engagement between the housing front side tubular part 81 and the outer tubular wall part 51, as shown in FIGS. 4 and 5.

Moreover, in this embodiment, the raised part 86 is formed in a shape of a rib extending along a direction of the engagement between the housing front side tubular part 81 and the outer tubular wall part 51.

Figure 6:
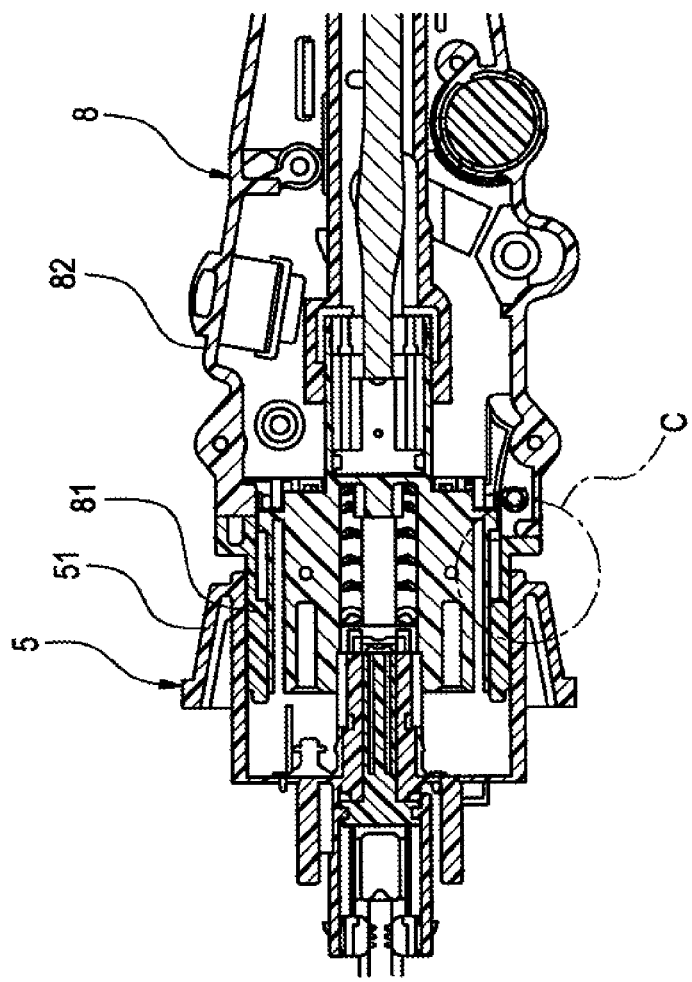
FIG. 6 is a longitudinal sectional view showing a state where a raised part of a housing front side tubular part of the power feeding side connector has overridden an inner periphery of an outer tubular wall part of the power receiving side connector, on halfway of the engagement between the power feeding side connector and the power receiving side connector in the embodiment.
Figure 7:
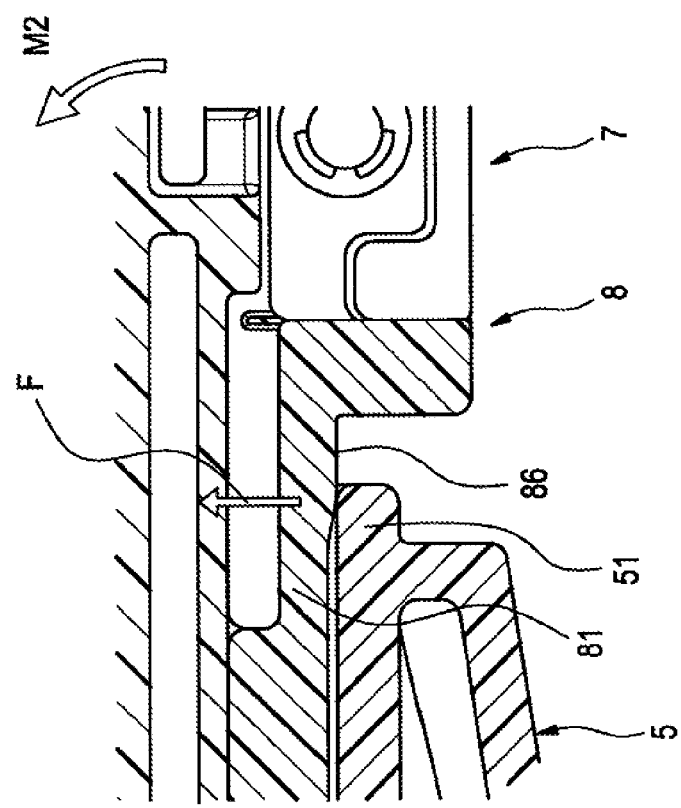
FIG. 7 is an enlarged view of a region C in FIG. 6.

As the engagement between the housing front side tubular part 81 and the outer tubular wall part 51 proceeds as shown in FIGS. 6 and 7, the above described raised part 86 overrides the inner peripheral face of the outer tubular wall part 51, before the engaging length of the housing front side tubular part 81 with respect to the outer tubular wall part 51 has reached the prescribed length. When the raised part 86 has overridden the inner peripheral face of the outer tubular wall part 51, as shown in FIG. 7, a rotation moment M2 for lifting the back part of the power feeding side connector 8 upward is exerted on the power feeding side connector 8 by a counter force which is applied from the outer tubular wall part 51 to the raised part 86. This rotation moment M2 corrects a backwardly inclined state of the power feeding side connector 8 due to its dead weight, into a state where axes of the outer tubular wall part 51 and the housing front side tubular part 81 are aligned with each other.

In the power feeding connector 7 in the embodiment as described herein above, in the initial period when the power feeding side connector 8 starts to be engaged with the power receiving side connector 5, as shown in FIGS. 4 and 5, the power feeding side connector 8 is inclined backward by a rotation moment M1 due to the dead weight of the power feeding side connector 8 itself, and the axes of the outer tubular wall part 51 and the housing front side tubular part 81 come into misalignment, in some cases.

However, as an operator further pushes the housing front side tubular part 81 of the power feeding side connector 8 into the outer tubular wall part 51 of the power receiving side connector 5, the raised part 86 which is provided on the outer periphery of the housing front side tubular part 81 at the lower end side thereof overrides the inner peripheral face of the outer tubular wall part 51, as shown in FIGS. 6 and 7, before the engaging length of the housing front side tubular part 81 with respect to the outer tubular wall part 51 reaches the prescribed length.

When the raised part 86 has overridden the inner peripheral face of the outer tubular wall part 51, the rotation moment M2 is exerted on the power feeding side connector 8 by a counter force F of the override so as to eliminate the backwardly inclined state due to the dead weight. As the results, a direction of the power feeding side connector 8 is automatically corrected so that the axes of the outer tubular wall part 51 and the housing front side tubular part 81 may come into alignment with each other.

Accordingly, when the power feeding side connector 8 is engaged and connected with the power receiving side connector 5, the operator can correct the backwardly inclined state of the power feeding side connector 8 without paying particular attention, thereby to smoothly complete the engagement and connection between the connectors.

As the results, it is possible to easily obtain the locked state in which the lock arm 32 of the power feeding side connector 8 is engaged with the locking step part 52 of the power receiving side connector 5.

Moreover, in the power feeding connector 7 in the embodiment as described above, because the raised part 86 has a shape of a rib extending along the direction of the engagement between the outer tubular wall part 51 and the housing front side tubular part 81, a contact area between the outer tubular wall part 51 and the raised part 86 is increased, as the engagement between the outer tubular wall part 51 and the housing front side tubular part 81 proceeds, and an overriding length of the raised part 86 with respect to the inner peripheral face of the outer tubular wall part 51 becomes larger. As the results, it is possible to stably obtain the counter force F for correcting the backwardly inclined state of the power feeding side connector 8.

It is to be noted that specific structures of the respective members of the power receiving side connector and the power feeding side connector which constitute the power feeding connector according to the present invention are not limited to those in the above described embodiment, but the members can be appropriately modified and improved.

According to the power receiving side connector of the present invention, as the engagement between the connectors proceeds, and the raised part formed on the outer periphery at the lower end side of the housing front side tubular part has overridden the inner peripheral face of the outer tubular wall part, the counter force of the override causes the rotation moment to be exerted on the power feeding side connector so as to eliminate the backwardly inclined state due to the dead weight. As the results, the direction of the power feeding side connector is automatically corrected so that the axes of the outer tubular wall part and the housing front side tubular part may come into alignment with each other.

Accordingly, when the power feeding side connector is engaged and connected with the power receiving side connector, the operator can correct the backwardly inclined state of the power feeding side connector without paying particular attention, thereby to smoothly complete the engagement and connection between the connectors.

What is claimed is:

1. A power feeding connector comprising:
    a power feeding side connector connected to a power supply; and
    a power receiving side connector mounted on a vehicle body of an electric automobile so that the power feeding side connector can be engaged with and connected to the power receiving side connector;
    wherein the power feeding side connector includes a housing front side tubular part to be engaged with an inner periphery of an outer tubular wall part of the power receiving side connector, and a lock arm adapted to be locked to a locking step part formed on the inner periphery of the outer tubular wall part, when an engaging length of the housing front side tubular part with respect to the outer tubular wall part has reached a prescribed length, so as to keep the power feeding side connector and the power receiving side connector in a fastened state,
    wherein the housing front side tubular part is provided with a raised part which overrides an inner peripheral face of the outer tubular wall part, before the engaging length of the housing front side tubular part with respect to the outer tubular wall part reaches the prescribed length, and the raised part corrects a backwardly inclined state of the power feeding side connector due to its dead weight into a state where axes of the outer tubular wall part and the housing front side tubular part are aligned with each other, and wherein the raised part is provided at a base side of the housing front side tubular part and on an outer periphery of the housing front side tubular part at a lower end side thereof, wherein the raised part has a continuous diameter about the housing front side tubular part that is disposed at a boundary between the housing front side tubular part and the power feeding side connector.

2. The power feeding connector as claimed in claim 1, wherein the raised part is formed in a shape of a rib extending along a direction of engagement between the outer tubular wall part and the housing front side tubular part.

* * * * *